(12) United States Patent
Li et al.

(10) Patent No.: US 7,949,005 B2
(45) Date of Patent: May 24, 2011

(54) DEVICE, SYSTEM, AND METHOD OF WIRELESS COMMUNICATION OF BASE STATIONS

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 11/860,986

(22) Filed: Sep. 25, 2007

(65) Prior Publication Data

US 2009/0082064 A1 Mar. 26, 2009

(51) Int. Cl.
*H04J 3/16* (2006.01)
(52) U.S. Cl. ........ 370/437; 370/447; 370/461; 370/462; 455/450; 455/464; 455/509
(58) Field of Classification Search ................ 370/335, 370/437, 447, 461, 462; 455/452, 522, 450, 455/464, 509; 375/347
See application file for complete search history.

(56) References Cited

U.S. PATENT DOCUMENTS

| | | | |
|---|---|---|---|
| 5,832,044 A * | 11/1998 | Sousa et al. | 375/347 |
| 7,558,229 B2 * | 7/2009 | Bachl et al. | 370/313 |
| 7,639,635 B2 * | 12/2009 | Anderson et al. | 370/280 |
| 2004/0160936 A1 * | 8/2004 | Liu et al. | 370/348 |
| 2005/0122999 A1 * | 6/2005 | Scherzer et al. | 370/480 |
| 2005/0154625 A1 * | 7/2005 | Chua et al. | 705/7 |
| 2006/0087980 A1 * | 4/2006 | Ikeda et al. | 370/252 |
| 2007/0081489 A1 * | 4/2007 | Anderson et al. | 370/329 |
| 2007/0121744 A1 * | 5/2007 | Zuckerman et al. | 375/260 |
| 2007/0123267 A1 * | 5/2007 | Whinnett et al. | 455/452.2 |
| 2007/0161364 A1 * | 7/2007 | Surineni et al. | 455/343.4 |
| 2008/0064432 A1 * | 3/2008 | Park et al. | 455/522 |
| 2008/0069033 A1 * | 3/2008 | Li et al. | 370/328 |
| 2008/0108366 A1 * | 5/2008 | Hu | 455/452.1 |
| 2008/0144612 A1 * | 6/2008 | Honkasalo et al. | 370/370 |
| 2008/0165746 A1 * | 7/2008 | Sung et al. | 370/337 |
| 2008/0261588 A1 * | 10/2008 | Struhsaker | 455/426.2 |
| 2009/0010228 A1 * | 1/2009 | Wang et al. | 370/335 |
| 2009/0052353 A1 * | 2/2009 | D'Amico et al. | 370/280 |
| 2009/0147742 A1 * | 6/2009 | Tsai et al. | 370/329 |
| 2009/0252135 A1 * | 10/2009 | Benveniste | 370/338 |
| 2011/0014922 A1 * | 1/2011 | Jen | 455/450 |

OTHER PUBLICATIONS

Channel estimation and prediction for adaptive OFDMA/TDMA uplinks, based on overlapping pilots; Sternad, M.; Aronsson, D.; Acoustics, Speech, and Signal Processing, 2005. Proceedings. (ICASSP '05). IEEE International Conference.*
Overlapping Impacts and Resource Coordination for High-density Wireless Communication; Li Zheng; Hoang, D.B.; Computing and Communication Technologies, 2009.*
U.S. Appl. No. 12/016,609, filed Jan. 18, 2008.
T. Cover and J. Thomas, "Elements of information theory," John Wiley & Sons, 2006, pp. 524-541.
WiMAX Forum, "System Evaluation Methodology" version 1.0, Jan. 30, 2007, pp. 1-152.

* cited by examiner

*Primary Examiner* — Salman Ahmed
(74) *Attorney, Agent, or Firm* — Shiloh et al.

(57) ABSTRACT

Device, system and method of wireless communication of base stations. In some demonstrative embodiments a method may include, for example, transmitting a downlink transmission over a frequency band from a first base station during a first time period; and receiving at a second base station an uplink transmission over the frequency band during a second time period at least partially overlapping the first time period. Other embodiments are described and claimed.

12 Claims, 4 Drawing Sheets

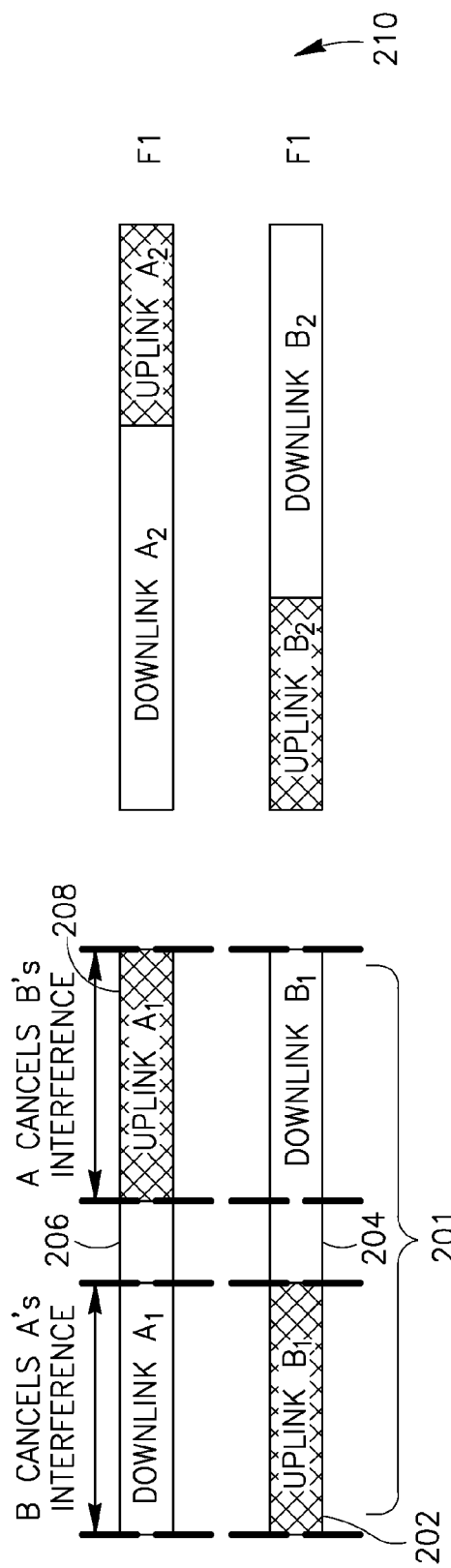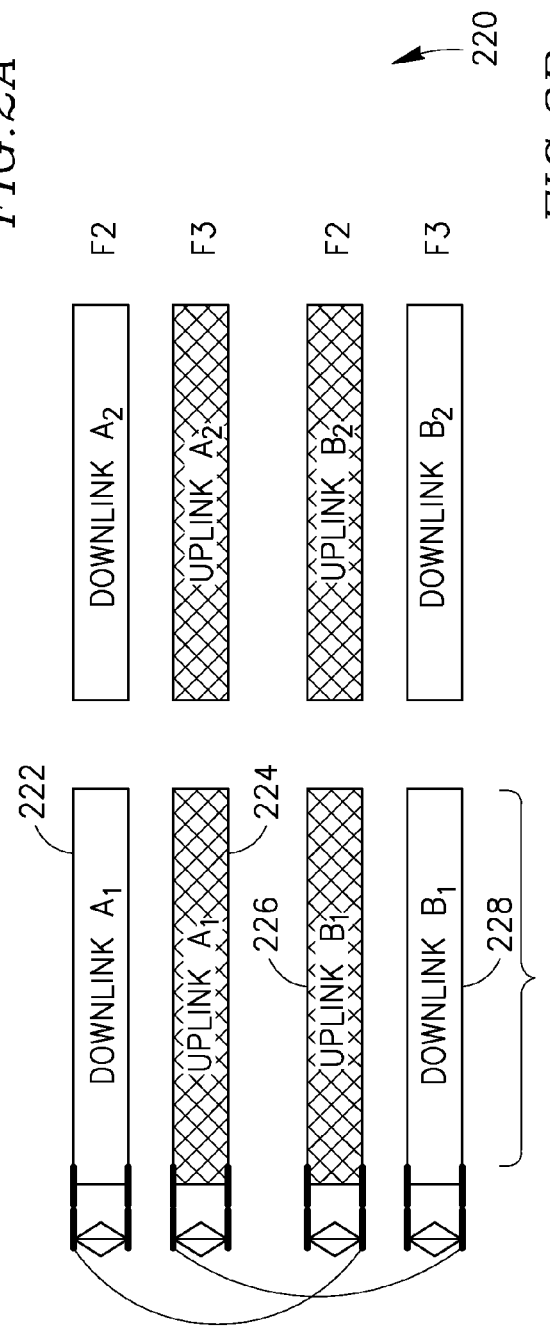

DEVICE, SYSTEM, AND METHOD OF WIRELESS COMMUNICATION OF BASE STATIONS

BACKGROUND

In cellular networks, a Radio Network Controller (RNC) may control a plurality of Base Stations (BSs). An upper Medium Access Control (MAC) layer may run at the RNC, and a lower layer MAC and a physical (PHY) layer may run at the base stations. The RNC may provide a base station with downlink data to be transmitted to one or more mobile communication devices associated with the base station The RNC may be connected to the base stations via wired links, e.g., having high bandwidth.

According to a conventional frame allocation all co-channel base stations may send downlink data simultaneously over the same frequency band, and receive uplink data simultaneously over the same frequency band.

In order to improve performance, data received from multiple base stations may be sent to the RNC, which may perform joint Multiple-Input-Multiple-Output (MIMO) detection This may require large bandwidth and increase the complexity of the RNC.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2A is a schematic illustration of a Time Division Duplexing (TDD) allocation scheme in accordance with some demonstrative embodiments;

FIG. 2B is a schematic illustration of a Frequency Division Duplexing (FDD) transmission allocation scheme in accordance with some demonstrative embodiments;

DETAILED DESCRIPTION

Figure 1:
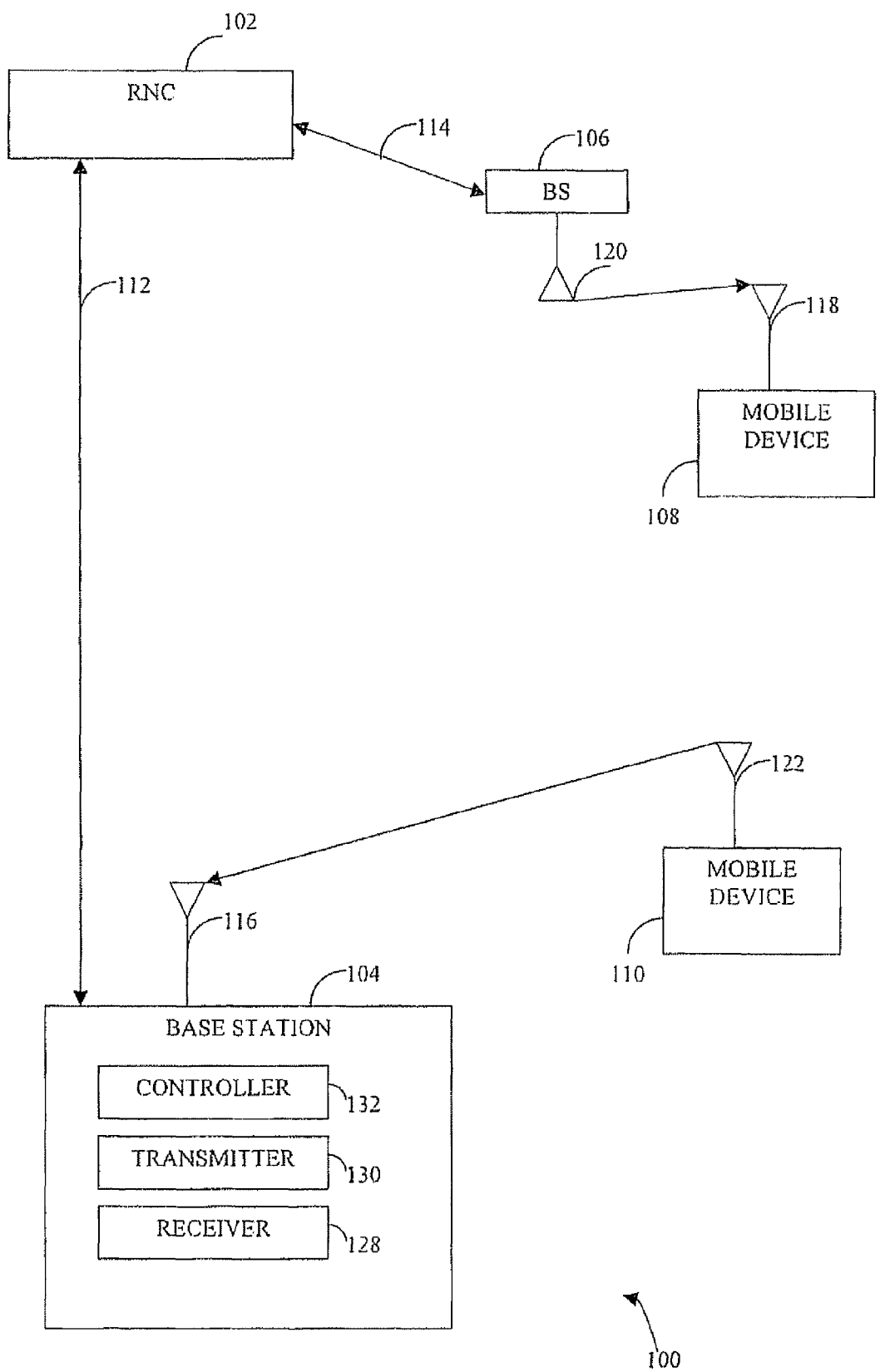
FIG. 1 is a schematic block diagram illustration of a wireless communication system in accordance with some demonstrative embodiments.

In the following detailed description, numerous specific details are set forth in order to provide a thorough understanding of some embodiments. However, it will be understood by persons of ordinary skill in the art that embodiments of the invention may be practiced without these specific details In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or, process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes The terms "plurality" and "a plurality" as used herein includes, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an oft-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), One way and/or two-way radio communication systems, cellular radiotelephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a wired or wireless handheld device (e.g., Blackberry, Palm Treo), a Wireless Application Protocol (WAP) device, or the like Types of WLAN and/or WMAN communication systems intended to be within the scope of the present invention include, although are not limited to, WLAN and/or WMAN communication systems as described by "IEEE-Std 802.16, 2004 Edition, Air Interface for Fixed Broadband Wireless Access Systems" standard ("the 802.16 standard"), and more particularly in "IEEE-Std 802.16e, 2005 Edition, Physical and Medium Access Control Layers for Combined Fixed and Mobile Operation in Licensed Bands", "IEEE-Std 802.16m, Air Interface for Fixed Broadband Wireless Access Systems—Advanced Air Interface", and the like, and/or future versions and/or derivatives and/or Long Term Evolution (LTE) of the above standards.

Some embodiments may be used in conjunction with one or more types of wireless communication signals and/or systems, for example, Radio Frequency (RE), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth, Global Positioning System (GPS), Wi-Fi, Wi-Max, ZigBee™, WiHD, Ultra-Wideband (UWB), Global System for Mobile communication (GSM), Enhanced Data GSM Environment (EDGE), 2 G, 2.5 G, 3 G, 3.5 G, or the like. Some embodiments may be used in various other devices, systems and/or networks.

FIG. 1 schematically illustrates a block diagram of a wireless communication system 100 in accordance with some demonstrative embodiments System 100 may include, for example, a plurality of base stations (BSs) capable of communicating with a plurality of mobile communication devices. For example, system 100 may include a first BS 104 capable of communicating with at least one mobile device 110; and a second BS 106 capable of communicating with at least one mobile device 108. Devices 108 and/or 110 may be or may include, for example, a mobile phone, a cellular phone, a handheld device, a computing device, a computer; a mobile computer, a portable computer, a laptop computer, a notebook computer, a tablet computer, a network of multiple inter-connected devices, a handheld computer, a handheld device, a PDA device, a handheld PDA device, a vehicular device, a non-vehicular device, a mobile or portable device, or the like. Devices 108 and/or 110 may include one or more antennas 118, and/or 122, respectively; and/or base stations 104 and/or 106 may include one or more antennas 116 and/or 120, respectively. Although embodiments of the invention are not limited in this respect, types of antennae that may be used for antennas 116, 118, 120 and/or 122 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, BS 104, BS 106, mobile device 108 and/or mobile device 110 may include a controller 132, a receiver 128, and/or a transmitter 130. For example, transmitter 130 may transmit via antenna 116 wireless RF signals, blocks, frames, transmission streams, packets, messages and/or data, e.g., to mobile device 110; and/or receiver 128 may receive via antenna 116 wireless RF signals, blocks, frames, transmission streams, packets, messages and/or data, e.g., from mobile device 110. Transmitter 130 may include, for example, any suitable RE transmitter; and/or receiver 128 may include any suitable RF receiver. Optionally, transmitter 130 and receiver 128 may be implemented using a transceiver, a transmitter-receiver, or other suitable component. In some embodiments, controller 132, transmitter 130 and/or receiver 128 may be implemented as part of a Medium Access Control (MAC) layer, a physical (PHY) layer of BS 104, and/or any other suitable communication layer or configuration.

In some demonstrative embodiments, base stations 104 and 106 may optionally be associated with a common Radio Network Controller (RNC) 102. For example, BS 104 may communicate with RNC 102 via a suitable link, e.g., a wired or wireless link 112; and/or BS 106 may communicate with RNC 102 via a suitable link, e.g., a wired or wireless link 114. In one example, a high layer MAC may be run by RNC 102, and a low layer MAC and/or a PHY layer may be run by base stations 104 and 106. RNC 102 may provide base stations 104 and 106, e.g., via links 112 and 114, respectively, with downlink data to be transmitted to mobile communication devices 110 and 108, respectively In other embodiments, base stations 104 and 106 may be associated with any other suitable communication device, and/or may communicate with one another directly, e.g., without using RNC 102.

In some demonstrative embodiments, information regarding transmissions from and/or to base stations 104 and/or 106 may be provided to base stations 104 and/or 106, for example, via links 112 and 114 in order, for example, to mitigate co-channel interference, which may result from the uplink and/or downlink wireless transmissions between BS 104 and mobile device 110, and the uplink and/or downlink wireless transmissions between BS 106 and mobile device 108, e.g., as described below.

In some demonstrative embodiments, BS 104 and BS 106 may include co-channel base stations capable of communicating over one or more common frequency bands For example, BS 106 may include base stations of interfering cells, which may contribute to one another relatively strong interference.

In some demonstrative embodiments, BS 104 may transmit a downlink transmission over a frequency band, denoted f, to mobile device 110 during a first time period, which may at least partially overlap a second time period, during which BS 106 may receive an uplink transmission from mobile device 108 over the same frequency band f, e.g., as described in detail below BS 104 may receive an uplink transmission, edge, from mobile device 110, over a frequency band f' during a third time period at least partially overlapping a fourth time period, during which BS 106 is to transmit a downlink transmission over the same frequency band f', e.g., to mobile device 108, e.g., as described below. The frequency bands f and f' may include the same frequency band, e.g., if the transmissions include Time Division Duplexing (TDD) transmissions; or different frequency bands, e.g., if the transmissions include Frequency Division Duplexing (FDD) transmissions, as described below.

Reference is also made to FIGS. 2A and 2B which schematically illustrate a TDD allocation scheme 210, and a FDD transmission allocation scheme 220 in accordance with some demonstrative embodiments. Although embodiments of the invention are not limited in this respect in some demonstrative embodiments schemes 210 and/or 220 may be implemented by system 100, e.g., by BS 104, BS 106, mobile device 108, and/or mobile device 110.

In some demonstrative embodiments, scheme 210 may allocate a transmission period 201 to be used for transmissions over a common frequency band, denoted f1, between a plurality of base stations and a plurality of mobile devices. Transmission period 201 may include a first time period 206 allocated to a downlink transmission from a first base station to a first mobile device, e.g., from BS 104 to mobile device 110; a second time period 202 allocated to an uplink transmission from a second mobile device to a second base station, e.g., from mobile device 108 to BS 106; a third time period 208 allocated to an uplink transmission from the first mobile device to the first base station, e.g., from mobile device 110 to BS 104; and a fourth time period 204 allocated to a downlink transmission from the second base station to the second mobile device, e.g., from BS 106 to mobile device 108. In one example, time periods 202 and/or 208 may be shorter than time periods 206 and/or 204, respectively.

In some demonstrative embodiments, time period 206 may at least partially overlap time period 202; and/or time period 208 may at least partially overlap time period 204. In one example, there may be a maximal overlap between time period 202 and time period 206; and/or a maximal overlap between time period 208 and time period 204. For example, time period 202 may be substantially entirely included within time period 206; and/or time period 208 may be substantially entirely included within time period 204.

In some demonstrative embodiments, scheme 220 may allocate a transmission period 221 to be used for transmissions over a plurality of frequency bands, e.g., including first and second frequencies, denoted f2 and f3, respectively, between a plurality of base stations and a plurality of mobile devices. Scheme 220 may allocate, for example, an uplink transmission to a first BS and a downlink from a second base station over a common frequency band during substantially overlapping time periods. For example, transmission period 221 may include a first time period 222 allocated to a downlink transmission from a first base station to a first mobile device over the frequency band f2, e.g., from BS 104 to mobile device 110; a second time period 226 allocated to an uplink transmission from a second mobile device to a second base station over the frequency band f2, e.g., from mobile device 108 to BS 106; a third time period 224 allocated to an uplink transmission from the first mobile device to the first base station over the frequency band f3, e.g., from mobile device 110 to BS 104; and a fourth time period 228 allocated to a downlink transmission from the second base station to the second mobile device over the frequency band f3, e.g., from BS 106 to mobile device 108. In one example, time periods 222, 224, 226 and/or 228 may have substantially the same length.

In some demonstrative embodiments, time period 222 may at least partially overlap time period 226; and/or time period 224 may at least partially overlap time period 228. In one example, there may be a maximal overlap between time period 222 and time period 226; and/or a maximal overlap between time period 224 and time period 228. For example, time periods 222, 224, 226, and 228 may overlap.

In some demonstrative embodiments a first interference to a first mobile device receiving a downlink transmission from the first BS may result from the uplink transmission of a second mobile device to the second BS, e.g., in accordance with transmission allocation schemes 210 and 220. The first interference may be much weaker than a second interference, which may result from a downlink transmission from the second BS to the second mobile device, e.g., if a conventional transmission scheme is implemented. For example, a transmit power of a BS may be about 16 dB higher than a transmit power of a mobile device. The first and second mobile devices may have relatively low antenna mountings compared, for example, to antenna mountings of the first and second base stations. Accordingly, the first interference may be weaker than the second interference, since a path loss between the first and second mobile devices may be higher than a path loss between the first and second base stations, and/or the between the second BS and the first mobile device.

Referring back to FIG. 1, in some demonstrative embodiments, BS 106 may receive information corresponding to the downlink transmission of BS 104, e.g., the downlink transmission of BS 104 overlapping with the uplink transmission of mobile device 108, for example, before BS 106 receives the uplink transmission of mobile device 108; and/or BS 104 may receive information corresponding to the downlink transmission of BS 106, e.g., the downlink transmission of BS 106 overlapping with the uplink transmission of mobile device 110, for example, before BS 104 receives the uplink transmission of mobile device 110, e.g., as described below.

In some demonstrative embodiments, BS 104 may receive from RNC 102 data of a packet of the downlink transmission of BS 106, e.g., the downlink transmission of time period of 204 (FIG. 2) that overlaps with time period 208 (FIG. 2), or the frequency band of time period 228 (FIG. 2) that overlaps with frequency band 224 (FIG. 2); and receive from BS 106 packet forming information of the packet of the downlink transmission of BS 106, e.g., as described below. BS 106 may receive from RNC 102 data of a packet of the downlink transmission of BS 104, e.g., the downlink transmission of time period 206 (FIG. 2) that overlaps with time period 202 (FIG. 2), or the frequency band of time period 222 (FIG. 2) that overlaps with frequency band 226 (FIG. 2); and receive from BS 104 packet forming information of the packet of the downlink transmission of BS 104, e.g., as described below. The packet forming information of the packet may include, for example, information related to a modulation type, a forward error correction coding type, a space-time coding type, one or more modulation parameters, one or more control signals, resource allocation of the packet, and/or any other suitable information Alternatively, BS 106 may directly receive, e.g., from RNC 102 or BS 104, symbols in the downlink transmission from BS 104 overlapping the uplink transmission of mobile device 108. Accordingly, BS 106 may not need to reconstruct the transmitted signal of BS 104 using the information of both data and packet forming.

In some demonstrative embodiments, BS 104 may detect the uplink transmission to BS 104 based on the information corresponding to the downlink transmission of BS 106; and/or BS 106 may detect the uplink transmission to BS 106 based on the information corresponding to the downlink transmission of BS 104, e.g., as described below.

In some demonstrative embodiments, RNC 102 may provide BS 104 with data of the packet of the downlink transmission of BS 106 via link 112; and/or provide BS 106 with data of the packet of the downlink transmission of BS 104 via link 114.

In some demonstrative embodiments, BS 104 may determine the downlink transmission of BS 106 based on the information corresponding to the downlink transmission of BS 106; and/or BS 106 may determine the downlink transmission of BS 104 based on the information corresponding to the downlink transmission of BS 104, using any suitable estimation, detection, and/or interference mitigation method or algorithm, e.g., as described below.

In some demonstrative embodiments, BS 104 may estimate an interfering channel response corresponding to the downlink transmission of BS 106 based on the determined downlink transmission of BS 106; and/or BS 106 may estimate an interfering channel response corresponding to the downlink transmission of BS 104 based on the determined downlink transmission of BS 104, eggs, as described below.

In some demonstrative embodiments, BS 104 may detect the uplink transmission to BS 104 during the uplink time period, for example, by reconstructing a received signal resulting from the downlink transmission of BS 106, and subtracting the reconstructed signal from a transmission received during the uplink time period, e.g., as described below.

In some demonstrative embodiments, a first BS, denoted A, e.g., one of base stations 104 and 106, may use downlink data transmitted from a second BS, denoted B, e.g., another of base stations 104 and 106, as channel training symbols to estimate an interfering channel of the BS B, and to cancel an interference from the BS B, while receiving uplink data from one or more mobile devices associated with the BS A, e.g., as described below. Canceling at the BS A the interference from the BS B may result, for example, in an improvement in network performance, e.g., an improvement of more than 20% in terms of spectrum efficiency. It is noted that an interference from a first mobile device associated with the BS A to a second mobile device associated with the BS B may be lower than the interference between the transmissions of the base stations A and B since, for example, a path loss between the first and second mobile devices is much higher than a path loss between the base stations A and B.

In some demonstrative embodiments, any suitable interference mitigation scheme or method may be implemented to reduce or cancel an interference of a signal from the BS B ("the interfering signal") to an uplink signal intended for BS A ("the uplink signal"). In one example, the BS A may obtain some data contained in the interfering signal, denoted $x_b$, before receiving the uplink signal, denoted $x_a$, A channel response, denoted $h_b$, of an interfering channel between the base stations A and B may be estimated by treating all the known data in the interfering signal as training pilots, and treating the uplink signal as noise. After estimating the channel response $h_b$, the interfering signal may be reconstructed, for example, by applying the estimated channel response $h_b$ to the known interfering signal $x_b$. The reconstructed interfering signal, denoted $r_b$, may be subtracted from a received signal $r_a+r_b$, wherein $r_a$ denotes the uplink signal as received by BS A. An interference-canceled signal corresponding to the signal $x_a$ may then be detected using any suitable detection method. It is noted that the mitigation method described above may not require synchronization of frequency and/or phase between the uplink signal and the interfering signal. Additionally or alternatively, the uplink and interfering signals may have different modulation types, e.g., CDMA and OFDMA.

In some demonstrative embodiments, the data $x_b$ and one or more modulation parameters of the interfering signal may be provided, egg, via links 112 and 114 connecting the base stations A and B to common RNC 102, e.g., as described above. The BS A may determine the interfering signal of the BS B using the data $x_b$ and modulation parameters to perform interference cancellation, e.g., as described above. It is noted that a bandwidth required for sending the data from the RNC to the BS A may be much lower than a bandwidth required for sending quantized samples of the uplink signal received by the BS A to the RNC. The RNC may have substantially all of the data $x_b$ except, for example, for one or more control signals, e.g., including transmission power control, hybrid automatic repeat request (H-ARQ), and/or modulation parameters ("the additional data"). Accordingly, the BS B may provide the BS A with the additional data, e.g., one frame before the BS B transmits the interfering signal. In other embodiments, the additional data may be provided to BS A at or after the uplink signal is received by BS A, for example, if BS A is capable of storing or buffering the uplink signal.

In some demonstrative embodiments, a relatively high level of accuracy may achieved in the channel estimation of the interfering channel since, for example, the data $x_b$ is known, and the whole interfering signal may be used as channel training symbols, e.g., as described above. The density of training symbol may increases by a factor of about eight, e.g., in Wi-Max transmissions. Additionally, both the interfering and receiving stations include base stations, which may have a Line Of Sight (LOS) condition. This may reduce a number of channels taps required for the channel estimation and may improve the estimation accuracy for the same amount of data samples. Additionally, both the interfering station and the receiving station include static base stations. Therefore, the receiving BS may improve the estimation accuracy by averaging over time.

Figure 3B:
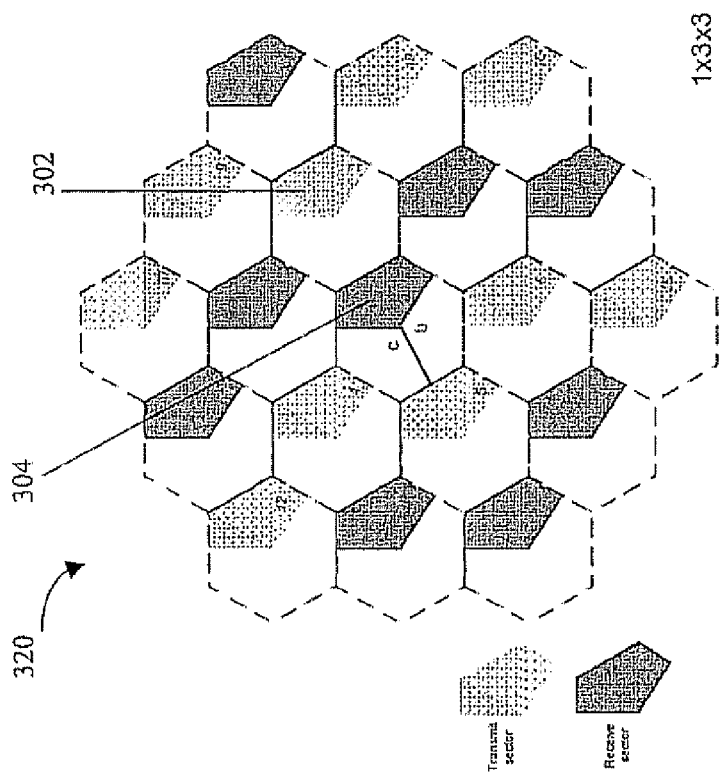
FIGS. 3A and 3B are schematic illustrations of first and second transmit/receive allocations, respectively, for a 1×3×3 Frequency Reuse Scheme (FRS) in accordance with some demonstrative embodiments of the invention.
Figure 3A:
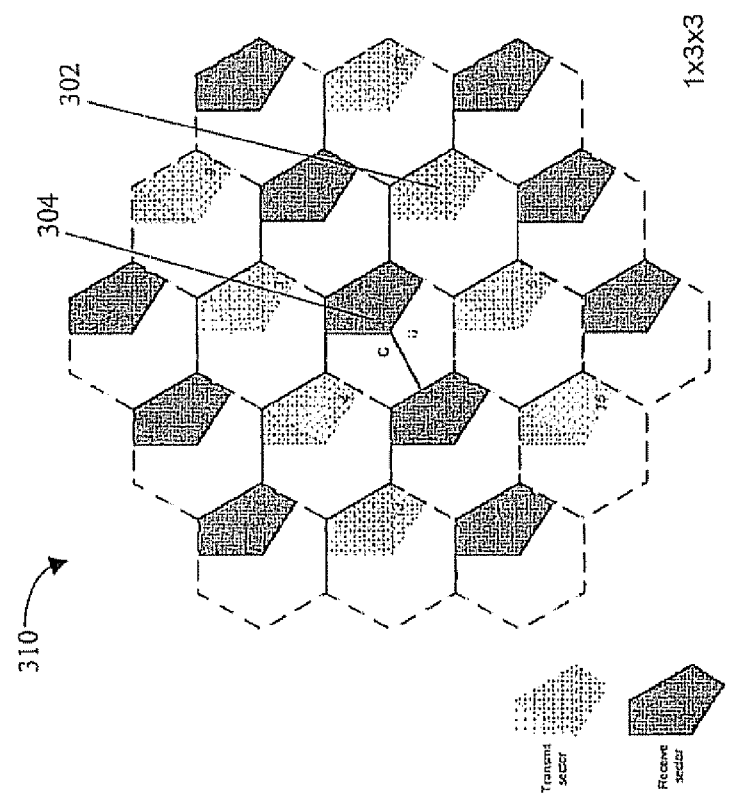

FIGS. 3A and 3B schematically illustrate a first transmit/receive allocation 310 and a second transmit/receive allocation 320, for a 1×3×3 Frequency Reuse Scheme (FRS) in accordance with some demonstrative embodiments of the invention. Although embodiments of the invention are not limited in this respect in some demonstrative embodiments allocations 310 and/or 320 may be implemented by system 100 (FIG. 1), e.g., by BS 104 (FIG. 1), BS 106 (FIG. 1), mobile device 108 (FIG. 1), and/or mobile device 110 (FIG. 1). Allocations 310 and 320 include nineteen cells each having the same FRS. Each of the cells may have three sectors, wherein each of the three sectors employs a distinct frequency. As shown in FIGS. 3A and 3B, a relatively strong interference from a transmit cell 302 may be canceled by a center cell 304.

The following table includes simulation results of downlink and uplink spectrum efficiency of a center cell in a 19-cell network for a conventional allocation scheme, allocation scheme 310 and allocation scheme 320. The simulation was carried out for a system including base stations having two transmit and receive antennas, and mobile devices having one transmit antenna and two receive antennas. A downlink and uplink time ratio of 1:1 was used for simplicity.

TABLE 1

|  | Conventional allocation | Allocation 310 | Allocation 320 |
| --- | --- | --- | --- |
| Downlink Spectrum Efficiency (b/s/Hz) | 4.08 | 5.78 (42% gain) | 5.32 (30% gain) |
| Uplink Spectrum Efficiency (b/s/Hz) | 2.01 | 2.72 (35% gain) | 2.96 (35% gain) |

Figure 4:
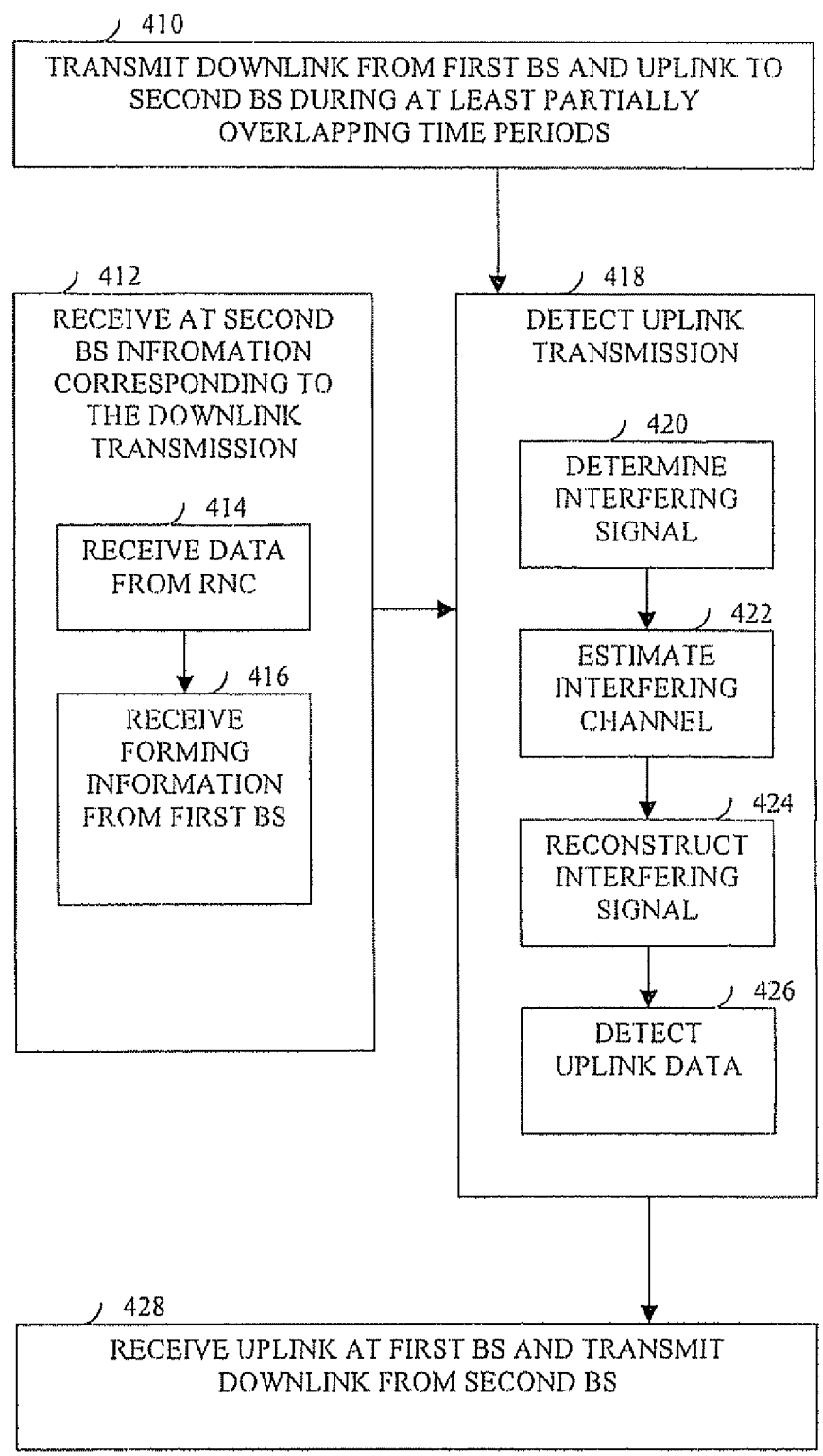
FIG. 4 is a schematic flow-chart illustration of a method of wireless communication in accordance with some demonstrative embodiments.

Reference is made to FIG. 4, which schematically illustrates a flow chart of a method of wireless communication in accordance with some demonstrative embodiments of the invention. Although embodiments of the invention are not limited in this respect, in some demonstrative embodiments one or more operations of the method of FIG. 4 may be implemented by system 100 (FIG. 1), e.g., by BS 104 (FIG. 1), BS 106 (FIG. 1), mobile device 108 (FIG. 1), and/or mobile device 110 (FIG. 1).

As indicated at block 410, the method may include transmitting a downlink transmission from a first BS over a frequency band during a first time period at least partially overlapping a second time period during which an uplink transmission is to be received at a second BS over the same frequency band. For example, the first and second base stations may implement the allocation scheme of FIG. 2A or 2B. The first and second base stations may include, for example, co-channel base-stations associated with a common RNC, e.g., as described above.

As indicated at block 412, the method may include receiving at the second BS information corresponding to the downlink transmission. For example, the second BS may receive the information corresponding to the downlink transmission before processing the overlapping part of the received signal of the second time period, e.g., as described above.

As indicated at block 414, receiving the information corresponding to the downlink transmission may include receiving data of a packet of the downlink transmission, e.g., from the RNC and/or the first BS. For example, the RNC may transmit the data of the downlink transmission to the second BS via a link, e.g., as described above.

As indicated at block 416, receiving the information corresponding to the downlink transmission may include receiving from the first base station packet forming information of the packet. For example, the first BS may transmit to the second BS the packet forming information, e.g., as described above.

As indicated at block 418, the method may also include detecting the uplink transmission at the second BS based on the information corresponding to the downlink transmission.

As indicated at block 420, detecting the uplink transmission may include determining an interfering signal of the downlink transmission. For example, the second BS may determine the interfering signal using the information corresponding to the downlink transmission, e.g., as described above.

As indicated at block 422, detecting the uplink transmission may also include estimating an interfering channel of the downlink transmission. For example, the second BS may estimate the channel response of the interfering channel based on the determined interfering signal, e.g., as described above.

As indicated at block 424, detecting the uplink transmission may also include reconstructing the interfering signal. For example, the second BS may reconstruct the interfering signal based on the channel response of the interfering channel, e.g., as described above.

As indicated at block 426, detecting the uplink transmission may also include detecting uplink data of the uplink transmission. For example, the second BS may subtract the reconstructed interference signal from the received uplink transmission, e.g., as described above.

As indicated at block 428, the method may also include receiving an uplink transmission at the first base station during a third time period at least partially overlapping a fourth time period, during which the second base station is to transmit a downlink transmission. For example, the first and second base stations may implement the allocation scheme of FIG. 2A or 2B.

Other suitable operations may be used, and other suitable orders of operation may be used.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a RAM, a ROM, a rigid magnetic disk, and an optical disk Some demonstrative examples of optical disks include CD-ROM, CD-R/W, and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etch) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters Other suitable components may be used.

Functions, operations, components and/or features described herein with reference to one or more embodiments, may be combined with, or may be utilized in combination with, one or mote other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   scheduling a first downlink period for transmitting a first downlink transmission from a first base station to a first mobile device, and a first uplink period for receiving at the first base station an uplink transmission from the first mobile device over a frequency band,
   wherein said first downlink transmission comprises first downlink data from a radio-network-controller (RNC) commonly associated with said first base station and a second base station,
   wherein said first downlink at least partially overlaps a second uplink period scheduled by the RNC for receiving at the second base station an uplink transmission from a second mobile device,
   and wherein the first uplink period at least partially overlaps a second downlink period scheduled by the RNC for transmitting a second downlink transmission, including second downlink data from said RNC, over said frequency band from said second base station to said second mobile device;
   at the first base station, receiving said second downlink data from said RNC, and packet forming information corresponding to a packet of said second downlink transmission, prior to receiving said uplink transmission from the first mobile device, wherein the packet forming information is related to information selected from a modulation type, a forward error correction coding type, a space-time coding type, one or more modulation parameters, one or more control signals, and resource allocation of the packet; and
   detecting said uplink transmission at said first base station based on the second downlink data received from said RNC.

2. The method of claim 1, wherein detecting said uplink transmission comprises:
   based on said second downlink data, determining at the first base station an interference to the uplink transmission caused by said second downlink transmission; and
   detecting said uplink transmission at said first base station based on the determined interference.

3. The method of claim 1, wherein said first and second base stations comprise co-channel base-stations.

4. The method of claim 1, wherein the first downlink period at least partially overlaps the second downlink period.

5. The method of claim 1, wherein receiving the packet forming information corresponding to the packet of said second downlink transmission comprises receiving the packet forming information from said second base station.

6. The method of claim 1, wherein said scheduled first downlink period includes said scheduled uplink period.

7. A system comprising:

a radio network controller (RNC) commonly associated with at least first and second co-channel base stations, wherein said RNC is to schedule a first downlink period for transmitting a first downlink transmission, including first downlink data, from said first base station to a first mobile device, wherein said RNC is to schedule a second downlink period for transmitting a second downlink transmission, including second downlink data, from said second base station to a second mobile device, wherein said RNC is to schedule a first uplink period, at least partially overlapping the second downlink period, for receiving at the first base station an uplink transmission from the first mobile device, and wherein said RNC is to schedule a second uplink period, at least partially overlapping the first downlink period, for receiving at the second base station an uplink transmission from the second mobile device, wherein the RNC is to provide the first downlink data to both said first and second base-stations prior to the second uplink period, and to provide the second downlink data to both said first and second base-stations prior to the first uplink period, and wherein said first base station is to receive packet forming information corresponding to a packet of said second downlink transmission, the packet forming information is related to information selected from a modulation type, a forward error correction coding type, a space-time coding type, one or more modulation parameters, one or more control signals, and resource allocation of the packet.

8. The system of claim 7, wherein said first downlink transmission and said second uplink transmission are transmitted over a first common frequency channel, and wherein said second downlink transmission and said first uplink transmission are transmitted over a second common frequency channel.

9. The system of claim 8, wherein said first downlink period overlaps said second downlink period, and wherein said first uplink period overlaps said second uplink period.

10. The system of claim 7, wherein said first downlink transmission, said second downlink transmission, said first uplink transmission and said second uplink transmission are transmitted over a common frequency channel.

11. The system of claim 10, wherein said first downlink period includes said second uplink period, and wherein said second downlink period includes said first uplink period.

12. The system of claim 11, wherein said first downlink period partially overlaps said second downlink period.

\* \* \* \* \*